Sept. 22, 1931.  P. D. LOWELL  1,824,726

INDUCTANCE COIL

Filed Feb. 12, 1926

INVENTOR
Percival Davis Lowell
BY
Walter H. Humphrey
ATTORNEY

Patented Sept. 22, 1931

1,824,726

UNITED STATES PATENT OFFICE

PERCIVAL DAVIS LOWELL, OF JAMAICA, NEW YORK

INDUCTANCE COIL

Application filed February 12, 1926. Serial No. 87,819.

My invention relates to inductance coils generally and while not limited in its application, is adapted specially for use in circuits where a fieldless inductance is either desirable or necessary.

In designing radio receiving apparatus, for example, it is found that the maximum impedance of a tuned circuit and therefore the maximum signal voltage is obtained when relatively large values of inductance and a small condenser are used.

Offsetting the important advantages of the use of large values of inductance, radio engineers have been faced with the difficult problem of overcoming oscillation resulting from the large magnetic fields created.

Among the suggested solutions were (1) using toroidal coils, (2) mounting the coils at right angles with respect to each other, (3) mounting the coils at a predetermined angle with respect to each other, which approximated 55 degrees.

The first plan was immediately abandoned owing to the enormous amount of wire required, which caused very high resistance.

The second plan proved fairly satisfactory but it was found that this method introduced considerable capacity coupling between stages, which was objectionable. There was also the dissymmetry resulting from having the coils pointing in all directions, which was likewise objectionable.

The third method has come into considerable use recently and it is found that with the coils arranged symmetrically, the correct angle is approximately 55 degrees, except when surrounding circuits and objects distort the field around the coils, as frequently happens, in which case it is difficult to determine the effective angle in a practical manner.

It is further found that a receiver with the coils so arranged at an angle, as in methods (2) and (3) above described, will pick up signals from nearby stations when the aerial and ground are disconnected from the receiver. Contrary to the general opinion, this is extremely disadvantageous, as it makes it very difficult, if not impossible to eliminate the signals of such stations, no matter where the tuning dials are set and, as selectivity is considered of prime importance, the test is that no signals should be heard in a receiving set when the aerial and ground, or loop is disconnected.

As the several methods mentioned have proved ineffective in eliminating interactions between inductances, as well as the direct picking up of signals by the coils themselves, I have devised what may be termed a fieldless coil, composed of two windings mounted in symmetric relation and so connected as to have no external magnetic field and a very small capacity field. Inductances constructed in accordance with the present invention, when employed in successive tube stages of a radio receiver, can be mounted at any angle with respect to each other or in parallel relation whichever is more convenient, or preferred.

A construction suitable for carrying my invention into effect is illustrated in the accompanying drawings but I do not wish to be understood as limiting myself to the same, as the invention may be embodied in various other forms and used in other relations, as will be apparent.

In the drawings—

Figure 1:
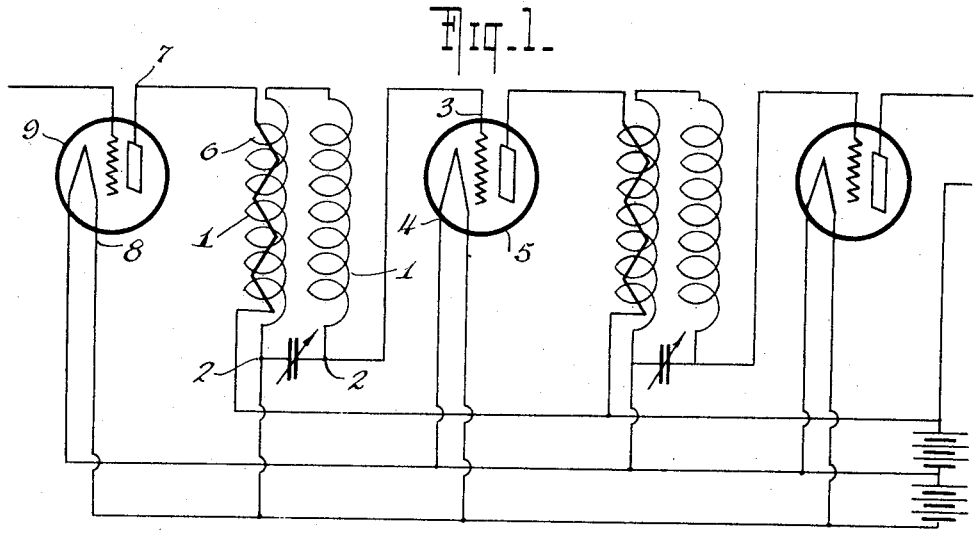
Fig. 1 shows a multi-stage radio frequency amplifier with my invention applied.

Referring to Fig. 1 of the drawings, my improved coil is shown adapted to serve as the secondary of each of several transformers, arranged in the usual manner to connect a number of tube stages of a radio frequency amplifier.

The coil comprises twin windings, 1, 1, arranged in parallel or other symmetrical relation and so connected that their external electromagnetic fields oppose and neutralize each other.

Preferably the windings 1, 1, are formed of the same number of turns, wound in the same direction and connected in series, so as to give equal and opposite potentials at the same end of the inductance unit, which has the effect of localizing and reducing the external capacity field.

When used in a radio receiver, the terminals 2, 2, of the secondary windings are connected to the grid 3 and filament 4 of the input circuit of the audion 5.

Suitably arranged within one of the secondary windings, the primary coil 6 is mounted and consists of a few turns equi-spaced throughout the length of the secondary winding with which it is associated. Leads from the primary to the plate 7 and filament 8 serve to connect it in the output circuit of the audion 9 in the usual manner.

Figure 2:
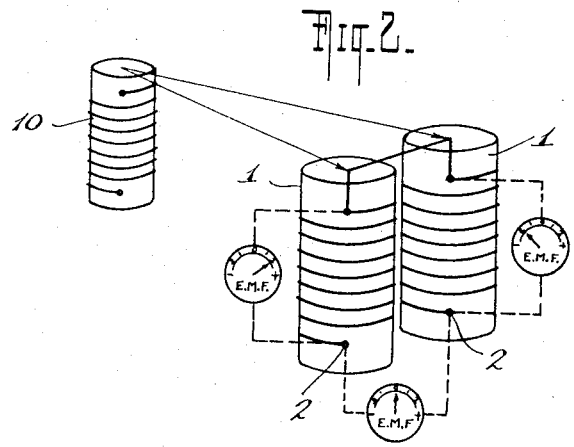
Fig. 2 is a view in diagram, illustrating the counter-balancing action of the windings of the inductance coil.

The behavior of this inductance unit may be more clearly understood by referring to Fig. 2 of the drawings. Here the two secondary windings are shown at 1, 1. Suppose a magnetic field originating at source 10, strikes the two windings 1, 1. Then the potentials induced in 1 and 1 will be equal, and, the winding being connected properly, the potentials will also be of opposite phase so that they exactly counter balance each other. Therefore the resultant potential at the ends 2, 2 of the unit will be zero.

Figure 3:
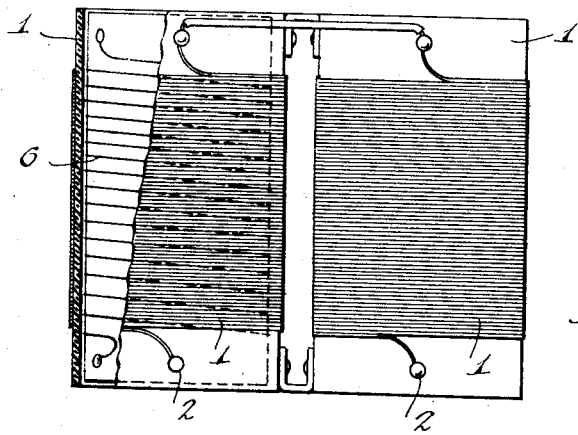
Fig. 3 is a detail view, partly in section of the inductance unit.

Figure 3 shows transformer type of fieldless inductance with 1, 1 the secondary windings, 2, 2 the terminals of the secondary unit and 6 the primary coils mounted within one of the secondary windings.

Having, therefore, described my invention what I claim is:

1. A radio frequency transformer made up of a substantially cylindrically wound primary winding and a secondary winding consisting of two similar substantially cylindrical coils disposed close to one another, with parallel axes, the secondary windings being so arranged that their magnetic polarities are opposite to one another, the primary winding being magnetically associated with one of the coils of the secondary winding.

2. An inductance unit comprising a pair of cylindrical supports disposed adjacent to one another, with parallel axes, a secondary winding consisting of two solenoidal coils wound on said cylindrical supports and so connected to one another that the two parts of the secondary winding have opposite magnetic polarities, a primary winding of cylindrical form inductively associated with one coil of the secondary winding, said secondary winding having a substantially confined electromagnetic field.

3. An inductance unit comprising a pair of cylindrical supports disposed close together with substantially parallel axes, a secondary formed by a continuous cylindrical winding on each of said supports, said windings being so connected that the two coils have opposing magnetic polarities and produce a substantially confined electromagnetic field, and a primary winding substantially cylindrical in form and arranged in inductive relation with the secondary.

4. An inductance unit comprising a pair of cylindrical supports disposed close together with substantially parallel axes, cylindrical secondary windings continuously wound on each of said supports, said secondary windings so connected that the two parts of the windings have opposing magnetic polarities to produce a substantially confined electromagnetic field and a primary winding substantially cylindrical in form and arranged in inductive relation with the secondary winding.

5. An inductance unit comprising a substantially cylindrically wound primary and a secondary consisting of two similar substantially cylindrical coils, each of a greater number of turns than the primary, the coils of the secondary being arranged in close relation with their axes parallel and so disposed that their magnetic polarities are opposite to one another, the primary winding being magnetically associated with one of the coils of the secondary and having its turns equally distributed throughout the length of the associated secondary coil.

6. In a radio transformer, a primary coil, and a secondary coil wound on two parallel axes with the turns of the windings in series, said primary coil in close inductive relation with only the portion of the coil on one of the two axes.

PERCIVAL DAVIS LOWELL.